United States Patent [19]

Forsyth

[11] Patent Number: 4,846,615

[45] Date of Patent: Jul. 11, 1989

[54] PIN AND WEDGE FASTENER FOR CONNECTING LATTICE PANEL BRIDGES

[75] Inventor: Richard C. E. Forsyth, Hook, Great Britain

[73] Assignee: Mabey & Johnson Ltd., Floral Mile, Great Britain

[21] Appl. No.: 54,310

[22] Filed: May 26, 1987

[30] Foreign Application Priority Data

May 29, 1986 [GB] United Kingdom ................. 8613061

[51] Int. Cl.⁴ ............................................. F16B 19/00
[52] U.S. Cl. .................................. 411/355; 411/354; 403/409.1; 403/408.1; 403/374
[58] Field of Search ............... 411/355, 354, 356, 513, 411/514, 516, 520, 944; 403/408.1, 405.1, 374, 409.1

[56] References Cited

U.S. PATENT DOCUMENTS

| | | | |
|---|---|---|---|
| 260,931 | 7/1882 | Bloomer | 411/516 X |
| 356,904 | 2/1887 | Tittle | 411/355 X |
| 759,503 | 5/1904 | Darling | 411/355 |
| 1,000,445 | 8/1911 | Sims | 411/355 |
| 1,016,554 | 2/1912 | Davenport | 411/355 |
| 1,866,484 | 7/1932 | Priem | 411/355 |
| 3,036,487 | 5/1962 | Hughes | 411/520 X |
| 4,419,872 | 12/1983 | Plifka | 70/57 X |

FOREIGN PATENT DOCUMENTS

| | | | |
|---|---|---|---|
| 1064061 | 12/1983 | U.S.S.R. | 403/374 |
| 860124 | 2/1961 | United Kingdom | 411/513 |
| 1379341 | 1/1975 | United Kingdom | 411/355 |

*Primary Examiner*—Lloyd A. Gall
*Assistant Examiner*—Curtis B. Brueske
*Attorney, Agent, or Firm*—Leydig, Voit & Mayer

[57] ABSTRACT

A pin and wedge combination for connecting together adjoining lattice bridge panels (M) is characterised in that the pin (P) has a plurality of diametric slots (S) spaced along its axis and with ends which overlap in the general direction of the axis. Additionally, the wedge (W) is curved and resiliently deformable in a plane perpendicular to its depth whereby the wedge is insertable by deformation into any selected one of the slots (S) and thereafter resiliently engages spaced points of the sides of that slot so as to be self-retaining therein.

4 Claims, 2 Drawing Sheets

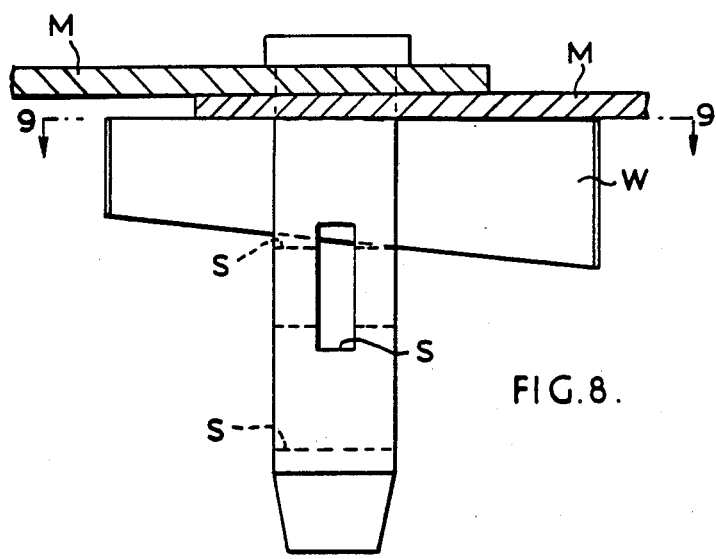
FIG. 8.
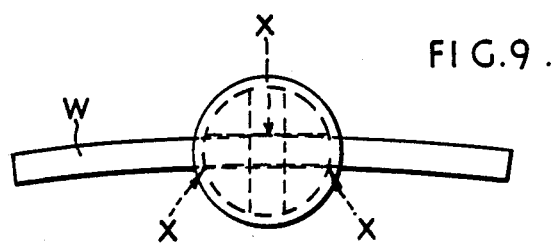
FIG. 9.
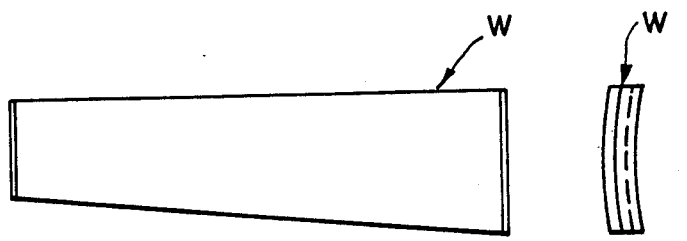
FIG. 10
FIG. 12.
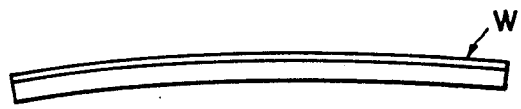
FIG. 11.

PIN AND WEDGE FASTENER FOR CONNECTING LATTICE PANEL BRIDGES

BACKGROUND OF THE INVENTION

This invention relates to lattice panel bridges and more particularly to the pin connections by which adjoining lattice panel bridge members are coupled together.

Conventionally lattice panel bridge members are coupled together by pins which have tapered ends or by bolts. When such a pin is driven it acts in the manner of a drift and automatically corrects misalignment of the holes in the sheaves of the members which are to be coupled together. Apart from this however it is necessary to maintain axial tension in the pin and to ensure that it neither loosens under the effect of vibration, nor rotates to a skew attitude between the two sheaves carrying opposing forces.

Conventionally, the pin is retained by use of a safety pin, or split pin or a circlip. None of these expedients however apply any axial tension or cause any frictional force between the sheaves.

The most efficient mode of applying tension and friction is to insert a wedge through a slot in the pins but the conventional wedge is uniplanar and relies solely on jamming friction to prevent loosening.

A further difficulty with the use of a conventional pin and wedge coupling arrangement is that the aggregated thickness of the sheaves to be coupled together can only vary by the difference between the maximum and minimum thickness, - that is to say the angle of taper, of the wedge.

SUMMARY OF THE INVENTION

To overcome these difficulties there is proposed, in accordance with the present invention, a pin and wedge combination characterised firstly in that the pin has a plurality of diametric slots spaced and elongated along its axis and with ends which overlap in the general direction of that axis and secondly in that the wedge is curved and resiliently deformable whereby the wedge is insertable by deformation into any selected one of the slots and thereafter resiliently engages spaced parts of the sides of that slot so as to be self-retaining therein.

A preferred pin and wedge combination according to the invention is illustrated in the accompanying drawings.

BRIEF DESCRIPTION OF THE DRAWINGS

FIG. 8 is a side elevation of the pin and wedge combination in an operative position;

FIG. 9 is a section on line 9—9 of FIG. 8; and

FIGS. 10, 11 and 12 are respectively a side, top and end elevation of an alternative embodiment of wedge.

DETAILED DESCRIPTION OF THE PREFERRED EMBODIMENT

Referring now to FIGS. 1 to 4 of the drawings it can be seen that the pin P is tapered at one end and has an enlarged head at the other end. Further the pin is formed with three diametric slots of rectangular cross-section spaced along its length, the two endmost slots being aligned in a particular longitudinal plane whilst the third or intermediate slot is aligned in a second longitudinal plane perpendicular to the first one. Also it can be seen that the slots are of equal length measured along the axis of the pin and that in the direction of that axis the adjacent ends of the endmost slots overlap the ends of the intermediate slot.

Figure 1:
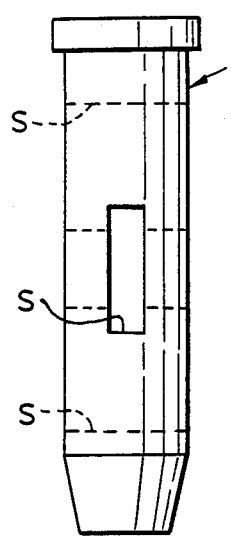
FIGS. 1 and 2 are mutually perpendicular side elevations of a panel connecting pin.
Figure 2:
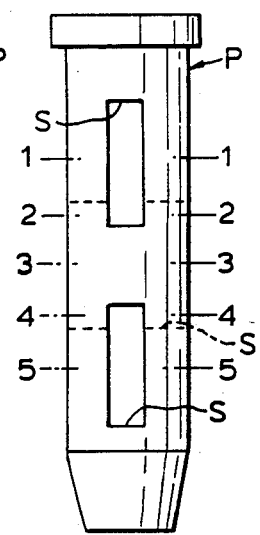
Figure 3:
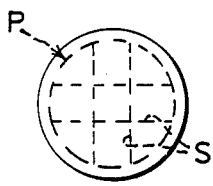
FIG. 3 is a view from the head end of the pin.
Figure 4:
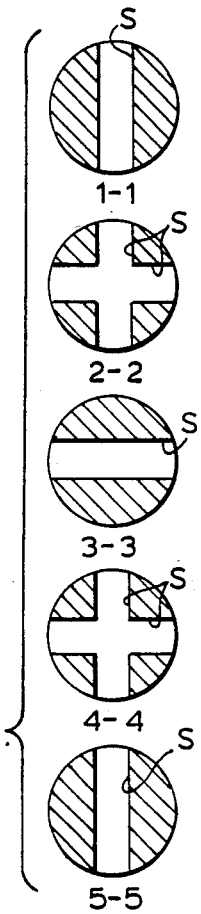
FIG. 4 is a series of cross-sectional views on lines 1—1, 2—2, 3—3, 4—4, and 5—5 of FIG. 2 respectively.
Figure 5:
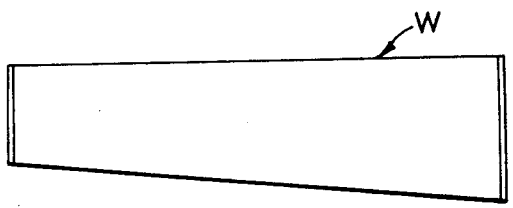
FIGS. 5, 6 and 7 are respectively a side, top and end elevation of a wedge.
Figure 6:
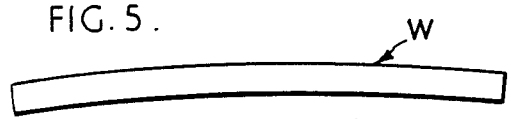
Figure 7:
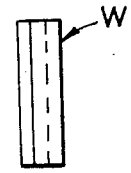

Referring now to FIGS. 5, 6 and 7 it can be seen how a spring steel wedge W intended to be inserted through a selected one of the three pin slots S is inherently curved in a plane perpendicular to its depth, the curvature being such that when the wedge is to be driven through a slot S it is preliminarily flattened.

FIG. 8 shows the mode of operation of the pin and wedge combination to connect together the overlapped sheaves M of a pair of lattice bridge panels. The wedge W has been inserted through the slot S nearest the head of the pin P so as to press the sheaves into tight frictional contact.

FIG. 9 shows how, due to its curvature and inherent resilience, the wedge W engages the sides of the slot at three spaced pressure points X and thereby is prevented from loosening under the effect of vibrational forces.

FIGS. 10, 11 and 12 illustrate an alternative form of wedge W' in accordance with the invention which is curved in two planes which are perpendicular to one another. Such a construction may enable a wedge of lesser thickness to be used.

Typically by use of a pin with three slots as aforesaid the same wedge an be used to apply force along the pin axis to sheaves which vary in total thickness from 10 mm to 60 or 70 mm.

The pin and wedge combination in accordance with the invention is not only applicable to the connecting together of any other structural elements by the invention of a pin through two or more aligned openings therein.

What is claimed is:

1. A pin and wedge combination for connecting together adjoining lattice bridge panels or the like, said pin being of circular cross-section, a purality of slots extending diametrically of said pin, said slots extending completely through said pin and being offset from one another along the axis of said pin, at least one end portion of each slot axially overlapping the adjacent end portion of an adjacent slot, each adjacent overlapping end portion being circumferentially offset from the overlapping end portion of an adjacent slot, said wedge said wedge being resilient and having a first curvature along a portion of the wedge for insertion within a selected slot, said wedge being insertable into any selected one of the slots and being shaped to wedge against one end of the slot, said wedge being flexed as an incident to being inserted into said one slot and thereafter resiliently engaging spaced points of the sides of such slot so as to be self-retained therein.

2. A pin and wedge combination in accordance with claim 1 in which one of said slots is located in a predetermined plane containing the axis of said pin and in which an adjacent one of said slots is disposed in a plane which is perpendicular to said predetermined plane.

3. A pin and wedge combination as defined in claim 1 in which there are three axially spaced slots formed through said pin, two of said slots being located in a predetermined plane containing the axis of said pin, the third slot being located in a plane which is perpendicular to said predetermined plane, said third slot being located between the other two slots and having end portions which axially overlap the adjacent end portions of the other two slots.

4. A pin and wedge combination as defined in claim 1 in which said wedge has a second curvature separate from said first curvature.

* * * * *